United States Patent [19]

Thompson et al.

[11] Patent Number: 4,598,450

[45] Date of Patent: Jul. 8, 1986

[54] METHOD FOR FABRICATING A SOLAR ENERGY COLLECTOR ASSEMBLY UTILIZING A SPECIFICALLY DESIGNED FLUID STORAGE ARRANGEMENT

[75] Inventors: James R. Thompson, Sunnyvale; Errol C. Armstrong, Salinas; Richard T. Wipfler, Menlo Park; Richard O. Rhodes, San Francisco, all of Calif.

[73] Assignee: FAFCO, Inc., Menlo Park, Calif.

[21] Appl. No.: 685,911

[22] Filed: Dec. 27, 1984

Related U.S. Application Data

[62] Division of Ser. No. 490,678, May 2, 1983, abandoned.

[51] Int. Cl.[4] .................... B21D 53/04; B23P 15/26; F24J 2/04
[52] U.S. Cl. .................... 29/157.3 V; 29/157.3 R; 126/437; 165/170; 219/83; 228/157
[58] Field of Search ................ 29/157.3 R, 157.3 V, 29/157; 165/170; 228/157; 219/82, 83; 126/437

[56] References Cited

U.S. PATENT DOCUMENTS

| | | | |
|---|---|---|---|
| 2,050,026 | 8/1936 | Tarbox | 219/83 X |
| 3,214,949 | 11/1965 | Johnson | 29/157.3 UX |
| 3,596,043 | 7/1971 | Sporri | 219/83 |

*Primary Examiner*—Howard N. Goldberg
*Assistant Examiner*—Irene Golabi
*Attorney, Agent, or Firm*—Flehr, Hohbach, Test, Albritton & Herbert

[57] ABSTRACT

A method for fabricating a solar energy collector assembly of the integral storage type is disclosed herein. This assembly utilizes a specifically designed storage arrangement which is expanded into its final shape from an initial collapsed configuration. In the specific embodiment disclosed, the storage arrangement includes many of its own design features apart from the overall collector assembly and serves as the main structural component of the entire assembly.

8 Claims, 15 Drawing Figures

METHOD FOR FABRICATING A SOLAR ENERGY COLLECTOR ASSEMBLY UTILIZING A SPECIFICALLY DESIGNED FLUID STORAGE ARRANGEMENT

This is a division of application Ser. No. 490,678 filed on May 2, 1983, now abandoned.

The present invention relates generally to solar energy collector assemblies and more particularly to a specifically designed assembly of the integral storage type including a specifically designed arrangement for containing a heat retaining fluid as well as a specific way in which this latter arrangement is made.

An integral storage type of solar energy collector assembly is one which not only contains a heat transfer medium, typically water, for collecting solar energy and transferring its heat to another medium, but is also one which serves as a storage container for the heat transfer medium. It is a general object of the present invention to provide such an assembly and specifically one displaying a number of different design features making it relatively uncomplicated to construct, relatively easy to mount in place, and efficient in operation.

A more specific object of the present invention is to provide a specific way of supporting the solar energy collecting assembly just recited at any location on a raised support surface having underlying load bearing components spaced relatively far from one another without having to place the assembly directly next to any of the load bearing components and without having to add additional components.

Another specific object of the present invention is to provide this last-mentioned solar energy collector assembly with a storage arrangement for containing the previously mentioned heat transfer medium, for example water, and particularly a storage arrangement which serves as the main structural component of the entire assembly, adding more structural integrity thereto than any other individual component in the assembly.

Still another specific object of the present invention is to provide the ultimately formed storage arrangement just mentioned with inlet and outlet plumbing configured to enhance the esthetic appeal of the overall assembly when the latter is mounted on a pitched roof or similarly inclined surface and to minimize the possibility of a freeze in the line to the inlet to the arrangement.

Yet another specific object of the present invention is to provide an uncomplicated and yet reliable frame arrangement and associated components for containing and supporting the storage arrangement just mentioned in a highly thermally insulated and moisture-proof fashion without adding appreciable weight to the overall assembly.

A further object of the present invention is to provide a specifically designed storage arrangement containing a heat transfer medium for use in an overall solar energy collector assembly and particularly an arrangement which is readily and rapidly placed in its ultimate operating condition from a collapsed configuration.

Still a further, more specific object of the present invention is to provide a storage arrangement having an initially collapsed outer housing which is comprised of confronting top and bottom sides and particularly a housing which is inflated or expanded to include a substantially larger inner compartment for containing and storing a given heat transfer medium.

Yet a further specific object of the present invention is to provide the housing just recited with elongated and collapsed but ultimately extendable baffles within its inner compartment and particularly baffles which also serve as a means of reinforcing the housing while, at the same time, defining the volume of the compartment as the housing is expanded from its initially collapsed configuration.

Still a further specific object of the present invention is to provide a particular relatively uncomplicated and reliable technique for welding together the top and bottom sides of the housing just recited as well as the baffles within its inner compartment.

A more particular object of the present invention is to weld the top and bottom sides of the housing together so as to provide certain non-linear weld joints which allow the housing to expand from its initially collapsed configuration with minimum wrinkles, even though the material housing actually shrinks in certain dimensions as it expands.

Still another particular object of the present invention is to provide an uncomplicated and yet reliable way of providing a non-linear weld joint of specific predetermined configuration for use in achieving the last-mentioned objective.

Yet another particular object of the present invention is to provide a specific way of welding the various baffles mentioned above to the inside surfaces of the top and bottom sides making up the last-mentioned housing and particularly an uncomplicated way which allows each baffle to be simultaneously welded to its top and bottom housing sides.

Still another particular object of the present invention is to locate the last-mentioned baffles within the inner compartment of the storage housing in a way which places the ends of the baffles in states of compression rather than tension after the storage arrangement has been expanded, whereby to minimize the possibility of failure at the joints between the baffles and the housing, especially at the ends of the baffles at the points.

As will be described in more detail hereinafter, the overall solar energy collector assembly disclosed herein utilizes the previously referred to storage arrangement and means for supporting the latter, specifically a rectangular support frame extending entirely around the outer periphery of the arrangement, as well as means cooperating with the frame for mounting the latter and the storage arrangement to a roof or similar support surface.

In accordance with one feature of the present invention, the mounting means just recited is comprised of a number of adjustable brackets which have associated mounting arms movable between different positions relative to the rest of the assembly in order to find convenient load bearing components forming part of the mounting surface without having to add such components. In accordance with another feature, the storage arrangement is provided with an inlet conduit for directing the heat transfer medium, specifically water, into the storage arrangement's inner compartment and a separate outlet conduit for directing the heat transfer medium out of the compartment. These two conduits are positioned relative to one another so that the heat from the hotter water leaving the outlet conduit can be used to prevent the inlet conduit from freezing. At the same time, these conduits are preferably placed in positions out of view from a bystander on the street when the overall assembly is disposed on a pitched roof. In accordance with still another feature of the present invention, the generally rectangular frame supported by the storage arrangement is open at its top surface and at its bottom surface and is intended to add little weight to the overall assembly relative to the storage arrangement. At the same time, the storage arrangement is intended to serve as the main structural component of the entire assembly.

Further features of the present invention reside in the storage arrangement itself and the way in which its housing is initially constructed for expansion to its ultimate operating configuration from a collapsed condition. To this end, the present invention provides for top and bottom sheets of material which are able to be bent into different shapes when subjected to predetermined forces but which are sufficiently rigid to retain the bent shapes after the forces have been removed. At the same time, a plurality of elongated baffles are provided, each of which has the same bendability and rigidity characteristics as the sheets and each of which includes top and bottom edge portions and an intermediate main section extending its entire length. The sheets and baffles are fixedly interconnected to one another in order to construct a collapsed housing having confronting top and bottom sides which are formed from the sheets and which are fixedly connected together at adjacent circumferential edges to define a sealed, collapsed inner compartment. The baffles are fixedly connected along their entire top and bottom edge portions to the top and bottom sides, respectively, with their intermediate main sections placed in longitudinally bent configurations. With this initially collapsed structure in tact, its inner compartment is temporarily pressurized sufficient to permanently bend the top and bottom sides near their circumferential edges while, at the same time, bending the baffles along their intermediate main sections in order to enlarge the inner compartment. Ultimately, the main sections of the baffles are caused to extend normal to an imaginary plane defined by the housing's circumferential edges, whereby the baffles serve as reinforcing ribs for the housing and also means for limiting the spacing between the housing's top and bottom surfaces. This enlarged housing is provided with means for directing heat retaining fluid, e.g., water or other such heat transfer medium, into and out of the housing's inner compartment.

In accordance with still another feature of the present invention, as regards specifically the storage arrangement just described, the latter is designed to expand from the collapsed configuration recited in a relatively easy manner. In accordance with yet another feature, the top and bottom surfaces of the housing forming part of the storage arrangement (which is preferably rectangular in configuration) are welded together along adjacent edges perpendicular to the baffles in a non-linear fashion so that the housing will expand but actually shrink in this dimension in a controlled manner with at most minimal uncontrolled wrinkling. In accordance with a further feature, each baffle is simultaneously welded to the top and bottom surfaces of the housing along its top and bottom edge portions respectively, using a single welding apparatus, itself designed in accordance with the present invention, to carry out this procedure. In accordance with still a further feature of the present invention, the opposite ends of each baffle are located sufficiently close to their adjacent edges of the housing such that the housing actually places these ends in compression rather than tension as the housing is expanded from its collapsed configuration.

Other features of the storage arrangement disclosed herein as well as the overall solar energy collector assembly and features relating to the particular way in which the welded joints are provided will be discussed in more detail hereinafter in conjunction with the drawings, wherein.

Figure 1:
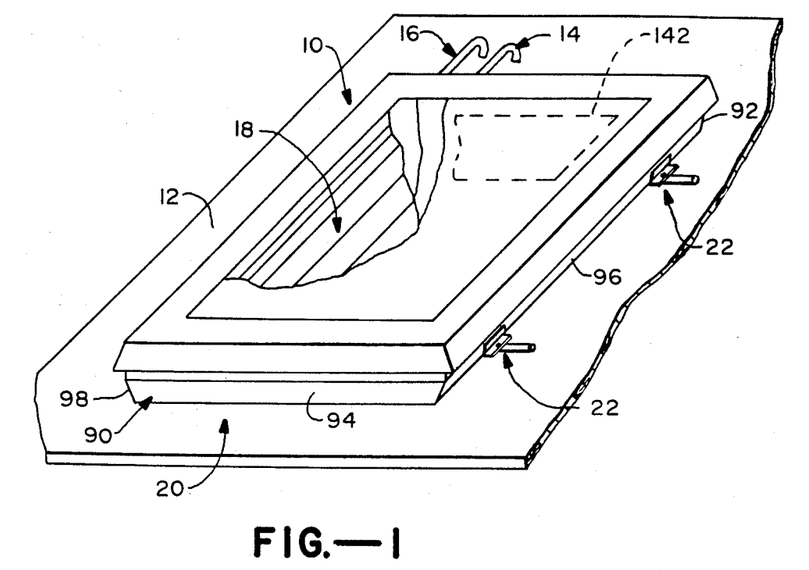
FIG. 1 is a perspective view of the solar energy collector assembly disclosed herein, this assembly being shown mounted on a pitched roof.

Turning now to the drawings, wherein like components are designated by like reference numerals throughout the various figures, attention is directed to FIG. 1. This figure illustrates an overall solar energy collector assembly of the integral storage type generally designated by the reference numeral 10. Assembly 10 which is generally rectangular in configuration is shown located on a pitched roof 12. As will be described hereinafter, the assembly includes specifically located and specifically designed inlet and outlet conduits 14 and 16, respectively. The inlet conduit serves to direct a supply of water (or other such heat transfer medium) from a suitable source, for example, a main supply line, to the assembly where it is heated up by the sun's rays and stored. The outlet conduit is provided for directing the heated water away from the assembly, for example, to a standing hot water tank or directly into the user's hot water line. Assembly 10 also includes a storage arrangement 18 for containing the water being heated (see FIG. 2), a frame arrangement or enclosure 20 for containing the storage arrangement (see FIGS. 11 and 12) and bracket arrangements 22 (see FIG. 13) for mounting the frame arrangement and storage arrangement and therefore the overall assembly to roof 12.

Figure 2:
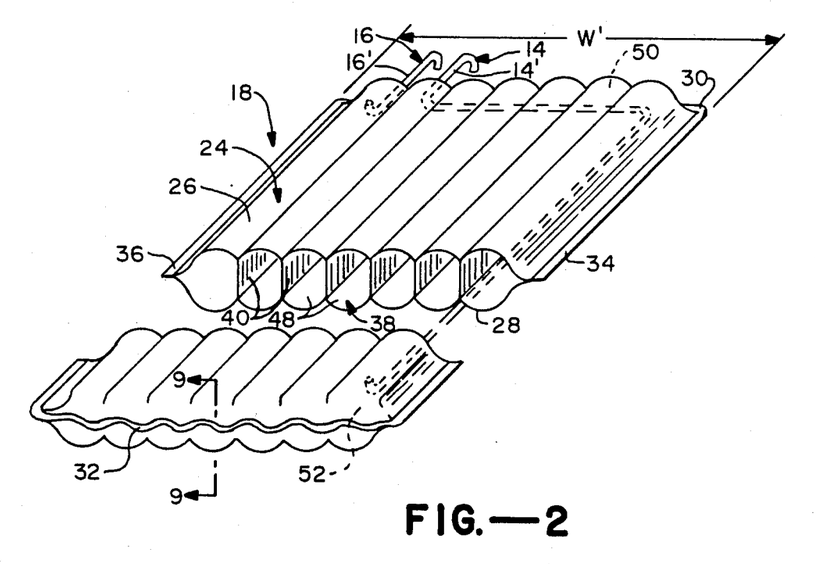
FIG. 2 is a broken-away perspective view of an ultimately formed (expanded) storage arrangement of the integral storage type forming part of the assembly illustrated in FIG. 1.

Referring specifically to FIG. 2, attention is now directed to the various components making up storage arrangement 18. As seen there, this arrangement is comprised of a generally rectangular outer housing 24 having confronting top and bottom sides or surfaces 26 and 28, respectively, which are constructed of stainless steel sheet metal or other such material which is able to be bent into a different shape when subjected to predetermined forces but which is sufficiently rigid to retain its bent shape after these forces have been removed. Top surface 26 and bottom surface 28 have adjacent top edges 30, adjacent bottom edges 32 and adjacent opposite side edges 34 and 36 which are fixedly connected together and which lie in a single common horizontal plane. These adjacent edges are preferably welded together in a specific way using a specifically designed welding technique, as will be seen hereinafter. The two housing surfaces are bent in a way which defines a sealed inner compartment 38 of given volume.

Figure 3:
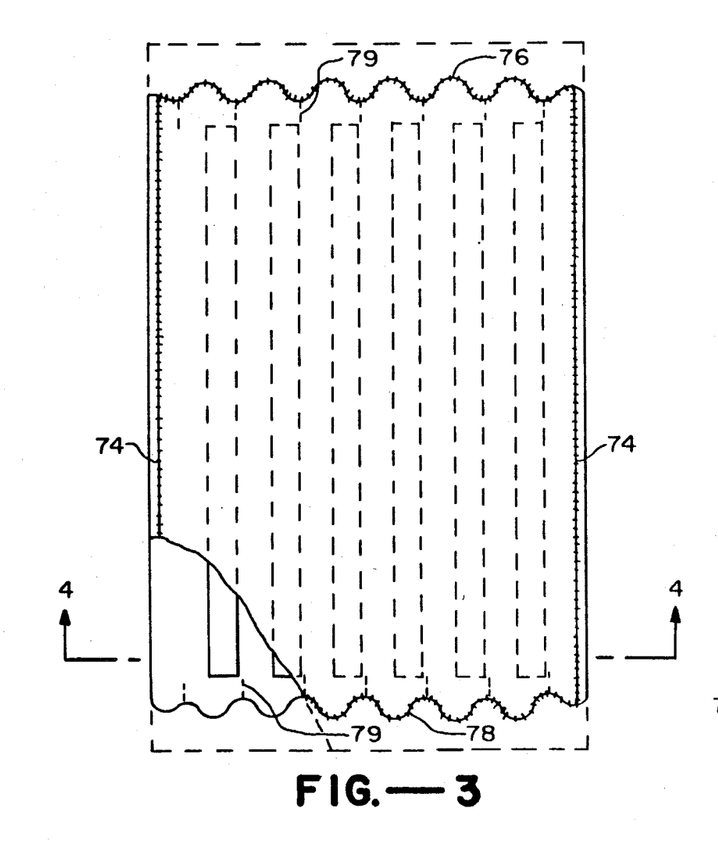
FIG. 3 is a partially broken-away plan view of the storage arrangement illustrated in FIG. 2, shown in an unexpanded state.
Figure 5:
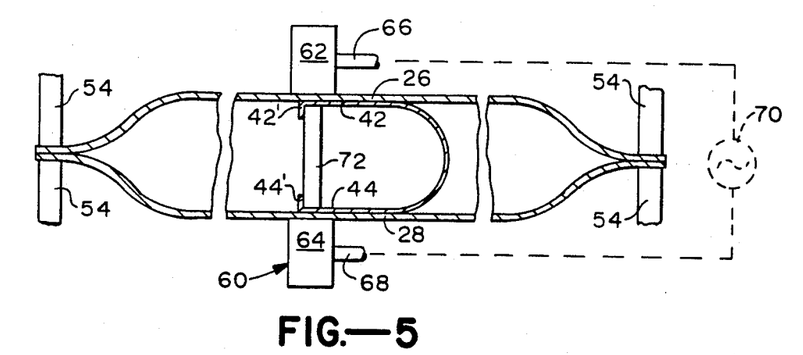
FIG. 5 diagrammatically illustrates how a baffle forming part of the storage arrangement of FIGS. 2 and 3 is welded in place within its associated housing which also forms part of the storage arrangement.
Figure 5A:
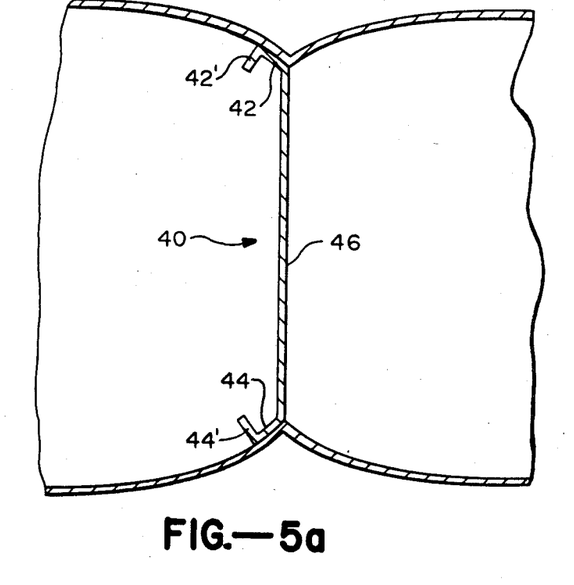
FIG. 5A is an enlarged sectional view illustrating a detailed feature of the storage arrangement of FIGS. 2 and 3.

Storage arrangement 18 also includes a plurality of elongated baffles 40, each of which is constructed of sheet metal or otherwise has the same or similar bendability and rigidity characteristics as the housing sides 26 and 28 discussed above. As best illustrated in FIG. 5A, each baffle includes top and bottom longitudinally extending edge portions 42 and 44, respectively, and an intermediate main section 46. The baffles are located within housing compartment 38 such that their intermediate main sections extend vertically widthwise (that is, normal to the common plate mentioned immediately above) in parallel spaced-apart relationship to one another and horizontally lengthwise in directions perpendicular to edges 30 and 32 of the housing. As best seen in FIG. 3 in conjunction with FIG. 9, the lengthwise ends of each baffle stop short of adjacent edges 30 and 32 and thereby provide a series of parallel flow chambers 48 extending between a top plenum 50 and a bottom plenum 52. The top and bottom edge portions 42 and 44 are fixedly connected to the inner surfaces of top sides 26 and bottom side 28, along their entire lengths. In a preferred embodiment, the baffle's edge portions are welded to the housing's top and bottom sides in accordance with a specifically designed technique to be described hereinafter.

With the exception of inlet and outlet conduits 14 and 16, respectively, overall storage arrangement 18 preferably consists only of housing 24 and baffles 40. In the particular embodiment illustrated, inlet conduit 14 is placed in fluid communication with housing compartment 38 by means of a cooperating opening into plenum 52 adjacent the bottom edge 32 of housing 24 near its righthand corner, as viewed in FIG. 2. Outlet conduit 16 is placed in fluid communication with compartment 38 by means of a cooperating opening in plenum 50 adjacent top edge 30 near the lefthand corner of the housing, again as viewed in FIG. 2. In this way, relatively cold water entering compartment 38 does so at the cooler end of the compartment, assuming the housing is positioned in the pitched fashion illustrated in FIG. 1. The hotter water within the compartment exits from its top, hotter end. However, as illustrated in FIG. 2, inlet conduit 14 extends upward from its lower righthand end along the outer surface of top side 26 and then bends across the top side where it eventually bends into parallel relationship with outlet conduit 16. As seen in FIG. 1, only these parallel conduits sections which are indicated at 14' and 16' are exposed to the ambient surroundings. The remaining sections of conduit 14 are either located below the roof 12 or within frame arrangement 20. The only section of conduit 16 other than section 16' is disposed inside roof 12.

From the discussion immediately above, it should be apparent that the only two sections of the conduits 14 and 16 that could possibly freeze are sections 14' and 16'. From a practical standpoint, section 16' cannot freeze since it will always contain hot water. Section 14' is purposely positioned sufficiently close to section 16' to take advantage of the heat radiating from the latter. More specifically, conduit section 14' is positioned in sufficiently close proximity to section 16' so that the heat from the latter will tend to prevent section 14' from freezing over. At the same time, by positioning these two exposed conduit sections at the location illustrated relative to the rest of the assembly, that is, behind its uppermost edge, they are hidden from view from a bystander at ground level.

Having described storage arrangement 18 in its ultimately formed operating configuration, attention is now directed to the way in which this arrangement is initially constructed in a collapsed configuration and ultimately expanded to its ultimate operating condition, as just described. To this end, reference is now made to FIGS. 3, 4, 5 and 5A. As seen specifically in FIG. 5, top and bottom surfaces 26 and 28 of arrangement housing 24 are initially provided in sheet form unconnected to one another. These two sheets are maintained in spaced-apart but parallel and confronting relationship to one another by suitable means such as by inserting welding and spacing plates to be described hereinafter at each baffle location and clamping the sheets together at the edge as shown at 54. Either prior to or after this positional relationship has been provided, each of the baffles 40 is disposed between the unformed top and bottom sides 26 and 28 in a bent fashion. More specifically, as illustrated in FIG. 5, the intermediate main section 46 of the baffle shown there is bent into a new shaped cross-sectional configuration while its top edge portion 42 engages the inner surface of top surface 26 along its entire length and bottom edge portion 44 engages the inner surface of bottom side 28, again along its entire length. With all of the baffles disposed between top side 26 and bottom side 28 in this manner, and properly positioned therebetween, their top and bottom edge portions are welded to the top and bottom sides along their points of engagement in the manner to be described hereinafter. For the moment, it suffices to say that once all of the baffles are fixedly connected (welded) between the top and bottom sides 26 and 28 in this manner, they are capable of supporting the housing sides in the positional relationship illustrated in FIG. 5 without the need for above-recited welding and spacing plates and the latter can be removed. In this way, the top, bottom and side edges of the two sheets (the housing sides) can be welded together in the manner to be discussed.

Referring still to FIG. 5, an assembly generally indicated at 60 for welding each of the baffles 40 to top side 26 and bottom side 28 is shown. This assembly includes a pair of electrically conductive rollers or wheels 62 and 64, preferably ones made of copper which are supported for rotation about their own axes by suitable means such as the axially extending shafts 66 and 68, respectively. These shafts support the two wheels in spaced apart confronting relationship to one another such that the top wheel 62 is able to roll along and against the outer surface of top side 26 while the lower wheel 64 is able to roll along and against the outer surface of the bottom side 28 in vertical alignment with one another. Of course, sides 26 and 28 can be moved relative to the wheels. At the same time, overall welding assembly 16 includes means generally indicated at 70 for applying a voltage potential between the two wheels.

An elongated, electrically conductive plate 72, preferably a copper plate, forming part of welding assembly 60, is disposed between and in physical contact with the top and bottom edge portions 42 and 44 of each baffle along its entire length. This plate closes an electric circuit between the two wheels 62 and 64 through the top and bottom housing sides and the top and bottom edge portions of its associated baffle along their points of engagement. As a result, current flows through the engaging points of these components, and the voltage supply is selected such that this current is sufficient to weld the components together along their engaging points as the wheels are moved lengthwise across top side 26 and bottom side 28 directly over and under the plate 72, thereby welding each baffle in place. Once this has been accomplished for each baffle, its associated plate 72 can be removed and the clamps 54 eliminated.

Welding assembly 60 is unique to the extent that it does not require a circumferential projection around each wheel which is normally necessary to concentrate the current along a welding line. The center plate 72 serves the same purpose and therefore each welding wheel can be provided with a smooth circumference and thereby eliminate a component (the projection) which is otherwise subject to wear. At the same time, the particular welding assembly illustrated can weld each baffle to its top and bottom sides simultaneously by using a single source of power.

Having described the way in which the various baffles 40 are welded to and between top side 26 and bottom side 28 of housing 24, attention is now directed to the particular way in which the adjacent edges of these sides are welded together to form inner compartment 38. In carrying out this welding procedure, it is important to take into account the fact that the overall housing will eventually be expanded from its collapsed configuration illustrated in FIGS. 3 and 4 to its ultimate operating configuration illustrated in FIG. 2. During this process, the length of the overall housing from edge 30 to edge 32 remains substantially constant. However, as will be seen hereinafter, the width of the housing from side edge 34 to side edge 36 decreases significantly from a width W (FIG. 3) to a width W' (FIG. 2). In an actual working embodiment where the collapsed housing displayed a width W of 44.75 inches, the width of the housing after expansion was 40.25 inches, thereby resulting in a difference of 4.50 inches.

Unless the dimensional shrinking just described is taken into account, the housing tends to wrinkle in a non-uniform, uncontrolled manner along its top and bottom edges 30 and 32. No such wrinkling tends to take place along side edges 34 and 36 since there is no shrinking therebetween. As a result, these latter edges can be welded together along straight line joints diagrammatically illustrated at 74. On the other hand, in accordance with the present invention, the top edges 30 and the bottom edges 32 of the housing are welded together along specifically designed, non-linear joint lines 76 and 78, respectively. More particularly, in order to entirely eliminate uncontrolled and non-uniform wrinkling along top and bottom edges 30, 32 of the housing as the latter expands from its collapsed configuration, and, instead, in order to cause the housing to decrease in width uniformly along these edges, both of the weld lines 76 and 78 are configured as specific sinusoidal (serpentine) waves. They could also be configured in a zig-zag configuration or other back and forth configuration which functions to eliminate uncontrolled and non-uniform wrinkling. For purposes of clarity, all of these shapes will be referred to as a serpentine configuration. As illustrated, each displays a constant frequency and uniform peak-to-peak amplitude. Moreover, these wave forms generally are not enough to ensure at most minimal wrinkling without taking into account their positional relationship with respect to baffles 40. They must be configured so that each intermediate section 46 of each baffle 40, if extended, would intersect the wave form 76 at a high point on its cycle and the wave form 78 at a low point on its cycle. In other words, the two sinusoidal waves must be 180° out of phase with one another. Moreover, the wave forms should be of sufficiently high frequency that the baffles are spaced exactly one cycle from one another. Finally, the radius of curvature of each cycle must be of a specific value depending on the height of spacing of the baffles. While this figure can be determined by trial and error, if it is too large or too small wrinkling may occur. In addition, in order to aid in controlling wrinkling so that it takes place at the desired location, the top and bottom sides 26, 28 are creased just inside wave forms 76 and 78 directly between sections 46 of the baffles, as indicated by dotted lines at 79.

All of the aspects of welded joints 76 and 78 just described contribute to their success in causing the compressive forces (which result when the housing moves inward during expansion) to spread uniformly across the width of the housing in order to eliminate the random and non-uniform concentration of these forces at any given points. These random concentration of forces are the primary cause of non-uniform and random wrinkling which can cause stress concentration and premature failure.

Figure 6:
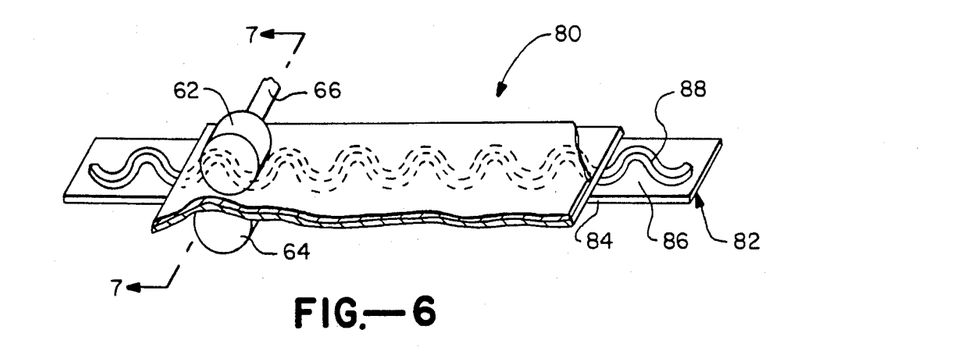
FIG. 6 is a perspective view of an assembly which is designed in accordance with the present invention for providing a non-linear welded joint.
Figure 7:
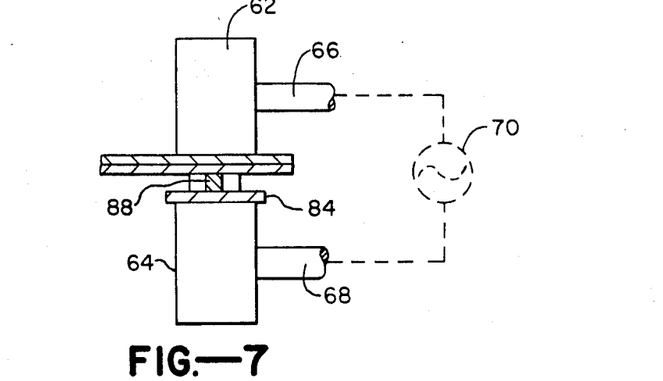
FIG. 7 is an enlarged sectional view of the assembly of FIG. 6 taken generally along line 7—7 in FIG. 6.
Figure 8:
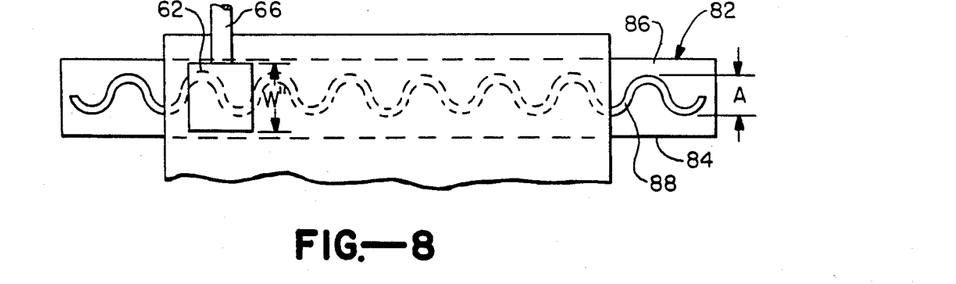
FIG. 8 is a top plan view of the assembly illustrated in FIG. 6.

Having described welded joints 76 and 78, attention is now directed to an assembly 80 which is utilized to provide them in an uncomplicated and yet reliable manner. This assembly is shown in FIGS. 6-8 including an elongated, electrically conductive plate 82 preferably of copper having an underside 84 and a top side 86, the latter supporting an elongated non-linear rib 88 which is also constructed of electrically conductive material, preferably copper or copper alloy. The rib corresponds in configuration to welded joints 76 and 78, that is, it is in the form of a sinusoidal or similar shaped wave having the frequency and amplitude characteristics of joints 76 and 78. Assembly 80 also includes previously described welding wheels 62 and 64, associated shaft 66 and 68, and voltage supply 70 along with means not shown for adjusting the spacing between the two wheels. For reasons to become apparent below, the width "W" of each wheel (see FIG. 8) is wider than the peak-to-peak amplitude A of the sinusoidal rib.

Assembly 80 is used to provide welded joint 76 in the following manner. The top unconnected edges 30 of housing sides 26 and 28 are brought into face-to-face engagement with one another using suitable means such as clamps (if necessary) after the baffles 40 have been welded in place in the manner described previously. The unconnected edges are shown in FIGS. 6–8. With these edges so positioned, they are brought into engagement with the top side of rib 88 with the plate 84 under it. Thereafter, the two welding wheels 62 and 64 are placed in rolling engagement with the upper surface of top side 26 along edge 30 and with the underside of plate 82, respectively. In this way, current passes between the two wheels through plate 82 and rib 88 and also through the top edges of housing sides 26 and 28 at their points of engagement with the rib. The rib serves to concentrate the current in the same way as previously described plate 72. A voltage 70 is selected so that the concentrated current produced is sufficient to weld the housing sides together along these points of engagement, that is, along a joint line corresponding in configuration to the rib.

Since the welding wheels 62, 64 are at least as wide as the peak-to-peak amplitude of the rib, they can be rolled longitudinally along the rib in a straight lined manner and still cause current to pass through all sections of the rib for providing a welded joint corresponding in configuration to the rib. Once this joint has been provided, assembly 80 can be removed and the material forming parts of the top and bottom housing sides outside the joint can be cut away or otherwise removed. This excess material is indicated by dotted lines in FIG. 3. The welded joint 78 can be made in the same manner.

It should be apparent that overall welding assembly 80 can be used for making welding joints apart from storage arrangement 18 and the shape of the joint can be easily varied by using ribs 88 of different configurations. In fact, assembly 80 could be utilized to make welded joints 74 by utilizing a straight rib rather than a non-linear one. In this way, the same wheels 62 and 64 could be used rather than having to provide ones which include their own circumferential projections. Otherwise, conventional welding techniques could be utilized for providing the joints 74. Moreover, it should be apparent that the welding wheels could be held stationary (with regard to lateral as opposed to rotating motion) while the plate 86 and rib 88 and edges 30 are moved therebetween.

Figure 3A:
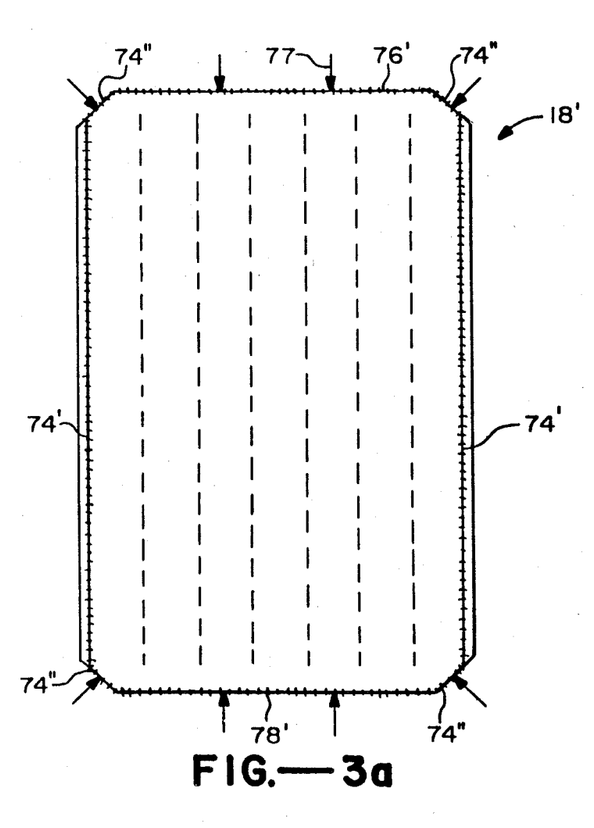
FIG. 3A is a view similar to FIG. 3 but showing a modified storage arrangement.
Figure 4:
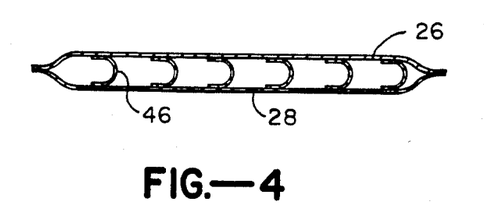
FIG. 4 is a sectional view of the storage arrangement illustrated in FIG. 3 taken generally along line 4—4 in FIG. 3, shown in an unexpanded state.

An alternative embodiment to the storage arrangement 18 illustrated in FIG. 3 is shown in FIG. 3a at 18'. This arrangement is provided in order to eliminate the sinusoidal (serpentine) waves characterizing the weld lines 76 and 78. Rather, straight weld lines 76' and 78' are used having angled welds 74", for example 45° at the corners where they meet weld lines 74'. To avoid uncontrolled wrinkling, suitable external tools (not shown) are pressed into the material at the 45° angle corners and at locations midway between baffles, as indicated by the arrows 77, for each compartment or for every second compartment to form creases during inflation of the configuration. For example, the unexpanded arrangement 18' shown in FIG. 3a could be located between blunt blades fixedly disposed on opposite sides of the arrangement but in close proximity thereto in the locations of arrows 77. Thereafter, the arrangement could be expanded so as to engage the blades part way into its full expansion, thereby providing the creases just mentioned. The creases allow shrinkage to occur without excessively stressing the material. The straight weld and angled corner welds can be done separately or can be done in a single operation using a welding assembly similar to 80 in FIG. 6.

Once housing sides 26 and 28 have been provided with ribs 40 in the manner described and interconnected along their edges, as also described, they form housing 24 in its collapsed configuration. This collapsed housing is now ready to be expanded into its ultimate operating configuration shown in FIG. 2. Compartment 38 is thereafter pressurized through conduits 14 and 16 by suitable means sufficient to cause top side 26 and bottom side 28 to move away from one another, except at their connected edges, while, at the same time, causing the intermediate sections 46 of baffles 40 to bend upright.

As illustrated in FIG. 2, longitudinal sections of housing top side 26 and housing bottom side 28 between baffles 40 tend to bow outward beyond the top and bottom longitudinal edges of the baffles. This results in the previously discussed reduction in the width of the overall housing from edge 34 to edge 36. In this regard, it should be apparent that the height of overall compartment 38 and therefore its volume is dependent in part on the height H (see FIG. 9) of each baffle. Because the material making up the housing and its baffles have the bendability and rigidity characteristics described previously, once housing is expanded, it remains nearly in this configuration without having to maintain the compartment 38 under pressure. In this way, after the housing has been expanded, the equipment to pressurize it can be removed.

Figure 10:
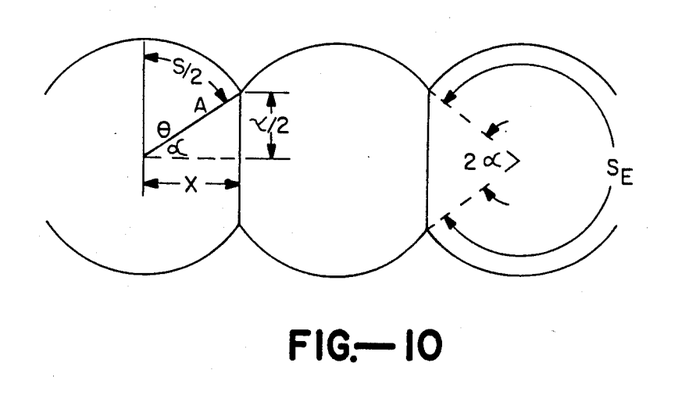
FIG. 10 diagrammatically illustrates a section of the storage arrangement illustrated in FIG. 2 for purposes of designing the way it expands to its ultimate shape.

Utilizing the procedure as described, overall housing 24 can be initially designed to minimize material per volume of storage fluid to surface area ratio at a given operating pressure for a given material. To this end, reference is made to FIG. 10 which diagrammatically shows the cross-section of the housing along with the number of geometric parameters which can be readily adjusted in view of the teaching herein.

Figure 9:
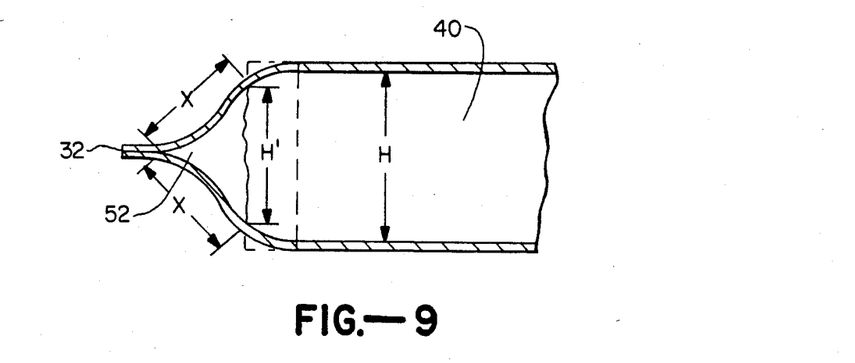
FIG. 9 is an enlarged longitudinal sectional view of a portion of the storage arrangement illustrated in FIG. 2, taken along line 9—9 in FIG. 2.

From the previous discussion of storage arrangement 18 and the way in which it is expanded from a collapsed configuration, it should be apparent that each baffle 40 is placed primarily in tension as the housing sides 26 and 28 move away from one another. Thus, the sidewalls want to pull away from each baffle at their points of connection along welded edge portions 42 and 44. If stress is concentrated at the very end of the baffle, weld failure can occur at that point and propagate the full length of the baffle. In order to overcome this problem, housing 24 and baffles 40 have been designed so as to place the end sections of each baffle in compression rather than tension. This is best illustrated in FIG. 9 where the maximum height H of the baffle from housing side 26 to housing side 28 is shown along most of the length of the baffle. However, at the end section depicted, the height H' is less than the height H. This is because the end shown is positioned sufficiently close to edge 32 such that the baffles maximum H is greater than the combined length of the tapering sections of the housing sides designated by the dimensions "X". In other words, the positional relationship of each end of each baffle relative to its adjacent housing edge is such that $H > 2X$.

As a result, when the housing 24 is expanded from its collapsed configuration, each end of each baffle is placed in compression rather than tension by housing sides 26 and 28 since there is not enough material along the tapering edges of the housing to allow the baffles to expand to their entire heights at their ends. While this clearly places greater tension on welded joints 76 and 78, than would be the case if the baffles were placed in tension at their ends, it has been found that the welded joints can withstand these greater forces more reliably than the joints connecting the baffles with the housing sides.

While referring to baffles 40, it should be noted that each includes longitudinally extending end segments 42' and 44' best illustrated in FIG. 5A. These segments result from the specific way in which the baffles are welded to housing sides 26 and 28. It would be desirable if these segments could be eliminated all together since they present crevices within housing compartment 38 which can ultimately cause corrosion which results in weak spots structurally. From a practical standpoint, it is difficult to eliminate these extra segments (and therefore the resulting crevices) in a reliable manner because of the particular way in which the baffles are welded in place between the two housing sides. More specifically, each of the previously described current conducting plates 72 cannot always be accurately positioned so that its associated weld line is provided at the very edge of its baffle. Accordingly, rather than try to eliminate the extra segments 42' and 44', each baffle is initially placed between the housing sides in a way which causes segments 42' and 44' to extend into compartment 38 in generally perpendicular directions relative to the housing sides. This maximizes the crevice angle and minimizes the possibility of corrosion. The way in which this is accomplished is by initially bending the ends of each baffle about its associated plate 72 so as to provide the right angles illustrated in FIG. 5. These right angles serve to align and locate welding plate 72 adjacent to the right angle bend. In this way, the edge portions 42 and 44 of each baffle are welded to their associated housing sides 26 and 28, respectively, just inside segments 42' and 44'. As a result, when the housing is expanded, segments 42' and 44' end up extending into compartment 38 in the right angular fashion shown in FIG. 5A.

Figure 11:
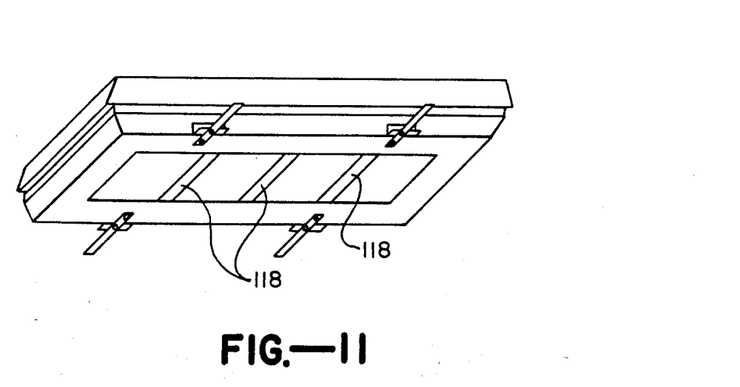
FIG. 11 is a perspective view of the overall solar energy collector assembly shown in FIG. 1 shown apart from its support surface and particularly depicting its underside.
Figure 12:
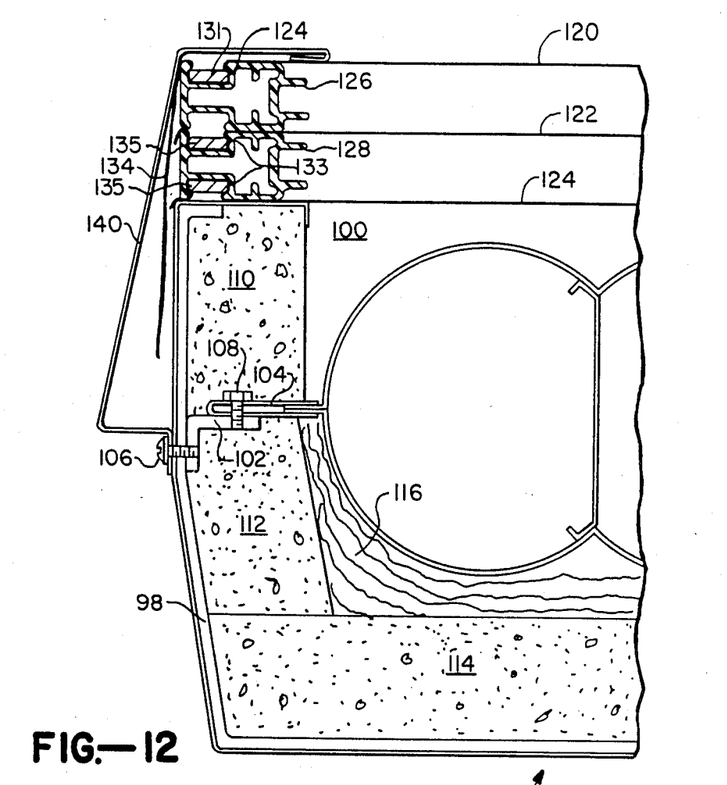
FIG. 12 is an enlarged cross-sectional view of one section of the assembly illustrated in FIGS. 1 and 11.

Having described storage arrangement 18 including the various features associated therewith, attention is again directed to overall solar energy collector assembly 10 and particularly frame arrangement 20 which is best illustrated in FIGS. 1, 11 and 12. This arrangement includes a rectangular frame or enclosure 90 which is defined by a top end 92, a bottom end 94 and opposite sides 96 and 98 which together form an inner chamber 100 (see FIG. 12) having a top opening and a bottom opening. As best illustrated in FIGS. 1 and 12, housing 24 forming part of storage arrangement 18 is disposed within chamber 100 such that its baffles 40 extend in directions parallel with frame sides 96 and 98. The housing is fixedly mounted just below the top opening of the frame a substantial distance above its bottom opening by means of longitudinally extending right angle flanges and cooperating U-clamps. One such flange and a cooperating U-clamp are illustrated in FIG. 12 at 102 and 104, respectively. The flange 102 is bolted at 106 or otherwise fixedly connected to frame or enclosure side 98 and the U-clamp 104 is bolted at 108 or otherwise fixedly connected to the flange. At the same time, this U-clamp is clamped around a corresponding section of edge 36 of housing 24. A number of these flange and clamp arrangements are provided along the length of frame side 98 for supporting the adjacent side of housing 24. In addition, similar flange and clamp arrangements fixedly connect frame side 96 with housing edge 34.

In order to thermally insulate housing 24, rigid blocks of foam insulation 110 and 112 are disposed on opposite sides of the housing between the latter and frame sides 96 and 98 and a continuous block of foam insulation 114 is disposed under the housing. Foam can alternatively be premolded or blown in place. Glass wool 116 or other such more pliable insulation is disposed within the space between the underside of housing 24 and the insulating blocks 112 and 114. In order to add further structural integrity to the overall frame and help support the weight of insulating block 114, a plurality of metal straps are suitably fixedly connected with frame sides 96 and 98 and extend across the frames underside in spaced apart parallel relationship to one another, as best illustrated in FIG. 11 where the straps are shown at 118.

Referring specifically to FIGS. 1 and 12 overall frame arrangement 20 is shown including three layers of light transparent material, specifically a top or outermost TEDLAR (a trademark of E. I. duPont de Hemours & Co., Inc.) layer and two inner layers of TEFLON (a trademark of the same company) extending entirely across and closing the top opening in frame 90. These layers which are indicated at 120, 122 and 124 are fixedly maintained in the positions shown by means of a series upper clamping frames 126 and lower clamping frames 128 which extend circumferentially around the top end of frame 90. The upper clamping frame 126 includes upper and lower slots 129 and a bar 131 cooperating with and interlocked in its upper slot. The lower clamping frame 128 includes upper and lower slots 133 and similar cooperating bars 135. As best illustrated in FIG. 12, the uppermost TEDLAR layer 120 has its circumferential end sections generally indicated at 134 extending over clamping frame 126 between its upper slot 129 and locking bar 131 and thereafter it drapes down below clamping frame 126, as indicated at 134 whereby layer 120 serves as a moisture seal. The intermediate and lowermost TEFLON layers 122 and 124 respectively have their circumferential end sections 136 and 138 extending over and under clamping frame 128 between its upper and lower slots 133 and cooperating locking bars 135. A cover plate 140 may be disposed entirely around the top end of frame 90 and locks clamping frames 126, 128 in the manner illustrated in FIG. 12. Suitable fastening means such as the previously recited bolts 106 could be utilized to hold this facia plate in place.

The light transparent layers 120, 122 and 124 serve to allow solar energy to pass into chamber 100 while protecting the latter from the ambient surroundings and acting as a means of thermal insulation. A more efficient way of providing the same results is to utilize one or more layers of material specifically designed to allow solar energy to pass therethrough while functioning as a more efficient thermal insulator. One example of this type of material is AEROGEL. While it may be desirable to use this or similar material from an economical standpoint, it is not always practical since it is generally more expensive than, for example, the TEDLAR material referred to previously. However, it is possible to use only a relatively small amount of the material in a very advantageous way. Specifically, this material would be used to cover only the upper section of the top opening in frame 90, as indicated by dotted lines 142 in FIG. 1. This area is selected because of the way in which the overall collector assembly is positioned on pitched roof 12. More specifically, the heat transfer medium within storage housing 24 is hottest at the upper end of the housing and therefore could more readily benefit from thermal insulation than the cooler heat transfer medium at the bottom end of the housing. As a result, while the entire opening of frame 90 is covered with solar energy transparent layers for example, the TEDLAR, the hotter end of the housing is protected to a greater extend thermally than the lower end by means of the special material 142.

Figure 13:
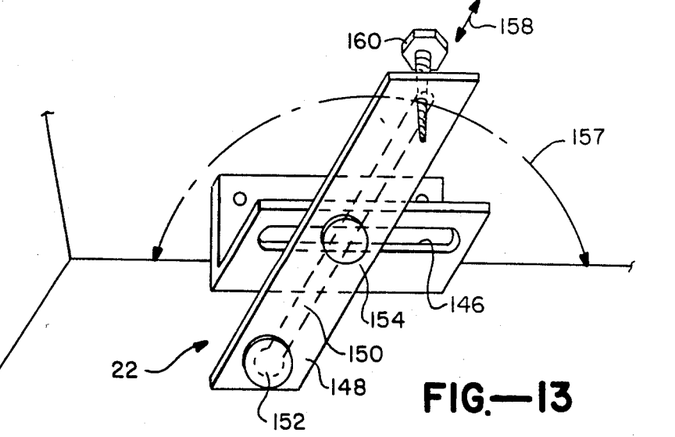
FIG. 13 is an enlarged perspective view of one of a number of mounting means for fixedly supporting the overall assembly shown in FIG. 1 to its support surface.

Having described overall frame arrangement 20, attention is now directed to mounting brackets 22 which serve to fixedly connect the frame arrangement 20 and storage arrangement contained therein on roof 12. While these mounting brackets could be of conventional types, in a preferred embodiment they are not. Rather, each is designed so as to be readily fastenable to an existing load bearing component on roof 12 regardless of its position relative to frame arrangement 20, to a limited extent. One of these mounting brackets is shown in FIG. 13 including an L-shaped flange 144 bolted, welded or otherwise fixedly connected to the outer surface of one side of frame 90. This flange includes an elongated slot 146. An elongated mounting arm 148 having its own elongated slot 150 is pivotally connected at one end to the underside of frame 90 by a suitable pivot pin 152 which allows the arm to move longitudinally along its slot relative to the pin. At the same time, a bolt or other suitable connecting means 154 slidably connects the mounting arm to flange 144 through cooperating slots 146 and 150. In this way, the otherwise free end of the mounting arm is movable both arcuately as indicated by arrow 157 and in a straight line fashion as indicated by arrow 158 so as to be adjustably positionable at any one of a number of different points. In this way, once the position of frame arrangement 20 on roof 12 is selected, the free end of each mounting arm 148 can be moved to a location directly above an adjacent load bearing component of the roof and fixedly mounted in place by means of log bolts or other suitable fastening means. One such log bolt is illustrated in FIG. 13 at 160.

What is claimed is:

1. A method of making a structural arrangement comprising the steps of:
   (a) providing top and bottom sheets of material which are able to be bent into different shapes when subjected to predetermined forces but which are sufficiently rigid to retain their bent shape after said forces have been removed;
   (b) providing a plurality of elongated baffles, each of which has similar bendability and rigidlity characteristics as said housing sides and each of which includes top and bottom edge portions and an intermediate main section extending its entire length;
   (c) fixedly interconnecting said sheets and baffles to one another in order to construct a collapsed housing having confronting top and bottom sides which are formed from said sheets and which are fixedly connected together at adjacent circumferential edges to define a sealed collapsed inner compartment, said baffles being fixedly connected along the entire top and bottom edge portions to said top and bottom sides, respectively, with their intermediate main sections placed in longitudinally bent configurations; and
   (d) temporarily pressurizing said collapsed inner compartment sufficiently to permanently bend said top and bottom sides near their circumferential edges and said baffles in a way which enlarges said compartment and places the main section of said baffles transverse to an imaginary plane defined by said circumferential edges, whereby said baffles serve as reinforcing ribs for said housing, and also as means for limiting the spacing between the housing's top and bottom sides;
   (e) said baffles being initially fixedly connected within said collapsed compartment in parallel relationship to one another, wherein each of said top and bottom sheet being constructed of weldable material which is rectangular in configuration such that the adjacent circumferential edges of said housing are divided into adjacent sections which are parallel to said baffles and adjacent sections which are perpendicular to said baffles, and said housing being constructed, in part, by welding together each of said adjacent edge sections perpendicular to said baffles in a way which forms a welded joint which is sufficiently non-linear in configuration so as to eliminate uncontrolled and non-uniform wrinkling at locations along the non-linear welded joint.

2. A method of making a storage arrangement said method comprising the steps of:
   (a) providing top and bottom sheets of material which are able to be bent into different shapes when subjected to predetermined forces but which are sufficiently rigid to retain their bent shape after said forces have been removed;
   (b) providing a plurality of elongated baffles, each of which has similar bendability and rigidity characteristics as said housing sides and each of which includes top and bottom edge portions and an intermediate main section extending its entire length;
   (c) fixedly interconnecting said sheets and baffles to one another in order to construct a collapsed housing having confronting top and bottom sides which are formed from said sheets and which are fixedly connected together at adjacent circumferential edges to define a sealed collapsed inner compartment, said baffles being fixedly connected along their entire top and bottom edge portions to said top and bottom sides, respectively, with their intermediate main sections placed in longitudinally bent configurations; and
   (d) temporarily pressurizing said collapsed inner compartment sufficient to permanently bend said top and bottom sides near their circumferential edges and said baffles in a way which enlarges said compartment and places the main sections of said baffles transverse to an imaginary plane defined by said circumferential edges, whereby said baffles serve as reinforcing ribs for said housing, and also as means for limiting the spacing between the housing's top and bottom sides;
   (e) said baffles being initially fixedly connected within said collapsed compartment in parallel relationship to one another, each of said top and bottom sheet being constructed of weldable material which is rectangular in configuration such that the adjacent circumferential edges of said housing are divided into adjacent sections which are perpendicular to said baffles, said housing being constructed, in part, by welding together said adjacent edge sections in a way which forms straight welded joints forming a rectangle having angled corners, and wherein those edge sections perpendicular to said baffles and said angled corners are formed with creases at predetermined spaced locations.

3. A method of making a storage arrangement for containing a fluid, for example a heat retaining fluid, especially suitable for use in a solar energy collector assembly but also suitable for use in other fluid storage assemblies, said method comprising the steps of:
 (a) providing top and bottom sheets of material which are able to be bent into different shapes when subjected to predetermined forces but which are sufficiently rigid to retain their bent shape after said forces have been removed;
 (b) providing a plurality of elongated baffles, each of which has similar bendability and rigidity characteristics as said housing sides and each of which includes top and bottom edge portions and an intermediate main section extending its entire length;
 (c) fixedly interconnecting said sheets and baffles to one another in order to construct a collapsed housing having confronting top and bottom sides which are formed from said sheets and which are fixedly connected together a adjacent circumferential edges to define a sealed collapsed inner compartment, said baffles being fixedly connected along their entire top and bottom edge portions to said top and bottom sides, respectively, with their intermediate main sections placed in longitudinally bent configurations; and
 (d) temporarily pressurizing said collapsed inner compartment sufficient to permanently bend said top and bottom sides near their circumferential edges and said baffles in a way which enlarges said compartment and places the main sections in said baffles transverse to an imaginary plane defined by said circumferential edges, whereby said baffles serve as reinforcing ribs for said housing, and also as means for limiting the spacing between the housing's top and bottom sides;
 (e) said baffles being initially fixedly connected within said collapsed compartment in parallel relationship to one another, each of said top and bottom sheet being constructed of weldable material which is rectangular in configuration such that the adjacent circumferential edges of said housing are divided into adjacent sections which are parallel to said baffles and adjacent sections which are perpendicular to said baffles, and said housing being constructed, in part, by welding together in each of said adjacent edge sections perpendicular to said baffles in a way which forms a welded joint which is sufficiently non-linear in configuration so as to eliminate uncontrolled and non-uniform wrinkling at locations along the non-linear welded joint.

4. A method according to claim 3 wherein said baffles are constructed of weldable material and wherein said sheets and baffles are fixedly interconnected to form said collapsed housing by first placing said sheets in confronting relationship to one another with the baffles in their bent configurations positioned therebetween, and thereafter welding the top and bottom edge portions of said baffles to said top and bottom sheets, respectively along with the welding together of the adjacent circumferential edges of said sheets.

5. A method according to claim 4 wherein the top and bottom edge portions of each baffle are simultaneously welded to said top and bottom sheets, respectively, using a single welding apparatus to do so.

6. A method according to claim 4 wherein each of the adjacent edge sections of said sheets perpendicular to said baffles are welded together to define said non-linear joint, the latter having a serpentine configuration.

7. A method according to claim 6 wherein each of said welded serpentine joints takes generally the form of a wave having uniform amplitude and frequency, wherein one of these waves is 180° out of phase relative to the other, and wherein the baffles are positioned relative to these waves such that the intermediate section of each baffle, if extended, would intersect a high peak point on one wave and an aligned low peak point on the other wave.

8. A method according to claim 7 wherein each of said welded serpentine configured joints is produced by first providing an elongated electrically conductive plate carrying an upwardly projecting, electrically conductive rib corresponding in length and configuration to each joint, placing said plate directly under or over each of the adjacent sections of said circumferential sheet edges which are to include serpentine configured joints such that its rib engages the underside or topside of the latter adjacent sections, and delivering a sufficiently large amount of electrical current through these adjacent sections along their points of engagement with said rib whereby to produce said welded, serpentine configured joint.

* * * * *